JUAN BELART
INVENTOR.

BY Karl F. Ross
Attorney

JUAN BELART
INVENTOR.

United States Patent Office 3,467,226
Patented Sept. 16, 1969

3,467,226
WHEEL-BRAKE CYLINDER ADJUSTER
Juan Belart, Walldorf, Germany, assignor to Alfred Teves Maschinen- und Armaturenfabrik K.G., Frankfurt am Main, Germany, a corporation of Germany
Filed July 21, 1967, Ser. No. 655,046
Claims priority, application Germany, July 28, 1966, T 31,706
Int. Cl. F16d 65/46, 51/24
U.S. Cl. 188—196                              10 Claims

ABSTRACT OF THE DISCLOSURE

A wheel-brake cylinder for a vehicle brake system having a cylinder housing provided with a cylinder bore, a piston axially shiftable in the bore for displacing a brakeshoe and a self-adjusting mechanism re-establishing a rest position of the piston upon displacement thereof beyond a predetermined stroke, the self-adjusting mechanism comprises an adjustment member received in said bore coaxially with said piston member, and a split resilient adjusting ring in form-fitting and wedging interengagement between the members upon movement of the piston member in one direction relative to the adjustment member and to the housing and released by said members upon movement of the piston in the opposite axial direction.

My present invention relates to hydraulic brake systems and, more particularly, to a slider assembly for internal-expansion or drum-type brakes and the like.

It has been common practice in the hydraulic-brake field, especially for automotive vehicles and other installations in which a pair of arcuate brakeshoes are displaced outwardly against an internal cylindrical surface of a brake drum, to provide a common cylinder for the two brakeshoes of the wheel brake and to dispose a pair of axially shiftable pistons in this common cylinder for substantially concurrent movement outwardly to urge the respective brakeshoes into engagement with the brake drum. It has also been known to provide, in systems of this type, ratchet-like self-adjusting means for the pistons designed to compensate for the wear of the brakeshoe. Since the arcuate brakeshoes engage the cylindrical braking surface of the brake drum with greater or lesser efficiency depending upon the direction of rotation of the wheel and the extent of the self-tightening action, it has been found highly desirable to ensure a more or less uniform brake wear to preclude the need for replacing one brakeshoe while the other is of sufficient thickness to sustain continued operation. Prior multipartite assemblies for self-adjustment of the rest positions of the pistons to equalize wear of the brake linings have been disadvantageous because of the numerous component parts, the complexity of the assembly, and a tendency toward malfunction.

It is, therefore, the principal object of the present invention to provide an actuating slider for hydraulic installations, especially vehicular brake systems, whereby the aforementioned disadvantages can be avoided and the self-adjusting means greatly simplified.

A further object of this invention is to provide a wheel-brake cylinder of the dual-piston type, adapted to be used in internal-expanding and drum-type vehicular brakes, which includes an improved self-adjusting arrangement of minimal length and complexity.

A further object of this invention is to provide an improved self-adjusting mechanism for a wheel-brake cylinder of the general character described which is less prone to malfunction than earlier systems performing the same general function.

Yet a further object of this invention is to provide an improved adjusting mechanism for the dual-actuating cylinder of a hydraulic internal-expanding brake which ensures uniform wear of the brake lining and, upon replacement of the brake lining or brakeshoe, can easily be repositioned.

These objects and others which will become apparent are attainable, in accordance with the present invention, by providing a hydraulic wheel-brake cylinder, in an internal-expanding brake system, which has a pair of pistons acting upon the respective brakeshoe and an adjusting body provided with a thread received in the cylinder between the brakeshoes and engageable with a split spring ring which forms a tight-fitting connection between the actuating piston and the self-adjusting body in the starting position of the nonactuated brake and, upon brake actuation, is relieved to break the tight-fitting bond between and permit relative displacement thereof. The split ring advantageously is received within the self-adjusting body which, according to this invention, is provided with an internal thread co-operating with a threaded boss of the piston.

According to a further feature of this invention, a wedge-like member, constituted by the adjustment ring, is clamped between the threaded adjusting member and the unthreaded piston member upon movement of the piston member axially inwardly and, conversely, is disengaged upon axial movement of the piston outwardly. In a modification of this invention, the piston or pistons of the wheel brake cylinder can be generally tubular while the adjusting member is an externally threaded member extending axially into the piston with clearance. The form-fitting connection between the actuating piston and the self-adjusting member with which it is threadedly interengaged is effected by cooperating conical surfaces of the adjusting ring and by the piston which advantageously is provided with axially spaced faces engageable with the adjusting ring upon movement of the piston in opposite axial directions and forming a lost-motion connection therewith. Thus, upon the face or flange of the ring opposite the conical face, I provide an internal or external thread which matingly engages the thread of the self-adjusting body. Furthermore, the piston can be provided with a recess (e.g. of annular configuration), in which the self-adjusting ring is seated and which has an axial width in excess of that of the ring to define the lost-motion or play therewith. When the split or slotted ring is relieved, i.e. the wedging formation of the piston withdrawn, the ring is destressed to disengage the thread of the adjusting the body from the thread of the ring.

The above and other objects, features and advantages of the present invention will become more readily apparent from the following description, reference being made to the accompanying drawing in which.

Figures 1, 4:
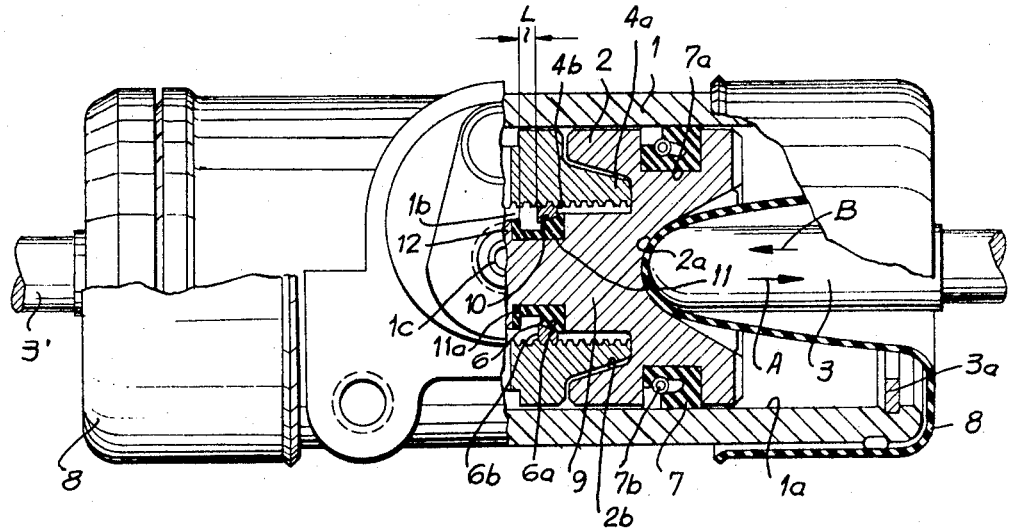
FIG. 1 is an axial cross-sectional view of one half of a wheel cylinder for an automotive internal-expanding brake embodying the present invention.
FIG. 4 is an axial cross-sectional view through a wheel-brake cylinder according to a modification of this invention.

In FIG. 1, I show a wheelbrake cylinder whose cylindrical shell or housing 1 is provided with a pair of axially shiftable pistons, one of which is illustrated in the broken-away portion of the cylinder. It will be understood that a corresponding piston and adjusting assembly is disposed in the left-hand side of the cylinder housing substantially mirror symmetrically with respect to the piston 2 illustrated here. An annular flange-type seal 7 is disposed in a peripheral groove 7a of the piston 2 and is retained by a coil spring 7b in place. The seal 7 slidably engages the wall 1a of the cylinder housing to prevent leakage of fluid from the chamber 1b between the pistons to which hydraulic fluid is supplied via a fitting 1c of the usual type. Each piston 2 is formed with a concave socket 2a in which the complementarily formed end of a force-transmitting bar 3 is received, the bar 3 being designed to engage the brakeshoe of an internal-expanding or drum-type brake of the type illustrated and described in Principles of Automotive Vehicles, U.S. Government Printing Office, 1956, pp. 424, 429 and 438 ff. At the outer extremity, the force-transmitting rod 3 is engaged by a dust cap 8 which prevents entry of contaminants into the wheel-brake cylinder. A spring ring 3a limits axial movement of the pistons 2 outwardly in the usual manner.

On the side of each piston 2 turned toward the hydraulic chamber 1b, the pistons are provided with respective cylindrical bosses 9 coaxial with the cylinder bore 1a and with one another, the boss 9 having an annular conical edge 10 forming a wedging shoulder for the split ring 6 whose inner surface 6a is frusto-conical and complementary to that of shoulder 10. In the direction of the pressurized side of the piston 2, from the shoulder 10, I provide an annular recess 11, which is provided with an elastomeric ring 11a in the region of the wedging surface 10 for frictionally preventing rotation of ring 6, terminating in an abutment flange 12 transverse to the axis of the cylinder which is engageable with the flank 6b of the ring 6. The flange 12 has an outer diameter somewhat smaller than the cylindrical portion of the boss 9 and is engageable with the ring 6 when the piston is shifted in the direction of arrow A. Between the boss 9 and the wall 1a of the cylinder housing, I provide an internally threaded adjustment body 4 in the form of a sleeve whose frustoconical nose 4a is received within the complementary cavity 2b of the piston 2. The sleeve 4 is axially shiftable within the cylinder bore 1a while its internal thread 4b is complementarily engaged by the outer thread of ring 6. The inner (crest) diameter of the threaded interior of the sleeve 4 is in excess slightly of the diameter of the boss 9. Thus, when the sleeve 4 and the piston 2 are shifted axially toward one another, i.e. when the piston 2 is displaced in a direction opposite to that represented by arrow A, the ring 6 is wedged outwardly and its thread permitted to engage in the complementary thread 4b of sleeve 4. When, however, the piston 2 is displaced away from the sleeve 4, the ring 6 is retained against axial movement by its threaded engagement at least initially and the ring is then released and permitted to spring inwardly into the recess 11 whose outer diameter is so selected that the ring 6 is fully withdrawn from engagement with the thread 4b and forms a ratchet-like connection therewith.

Figure 2:
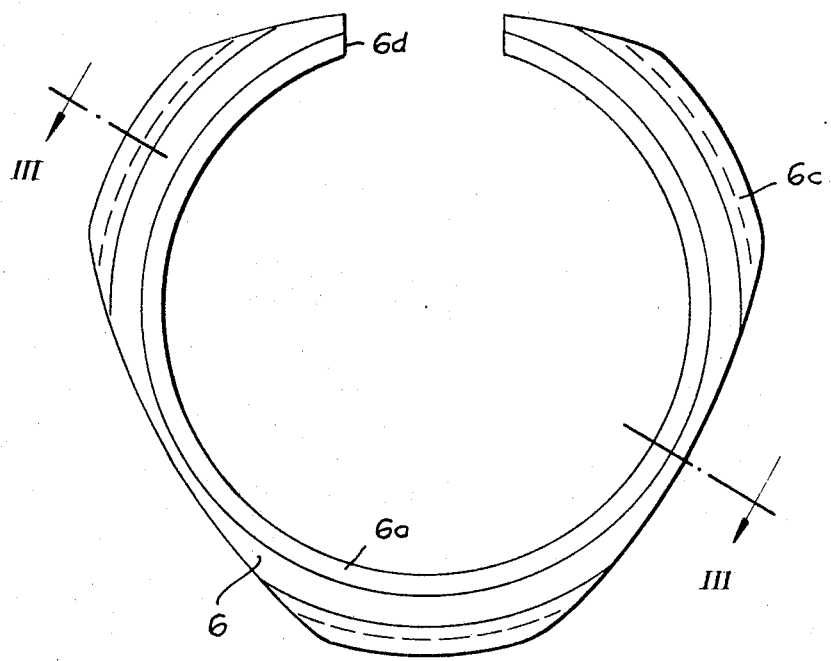
FIG. 2 is an enlarged view of the split-adjusting ring according to this invention.
Figure 3:
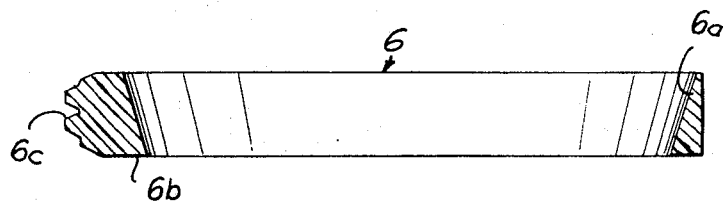
FIG. 3 is a cross-sectional view taken along the line III—III of FIG. 2.

Referring now to FIGS. 2 and 3 in which the ring 6 is shown in detail, it will be apparent that this ring is formed with the wedge-like frustoconical surface 6a previously described and with a flank 6b engageable by the abutment 12. Along its surface opposite the frustoconical wedging face 6b, there is provided a thread 6c complementary to and engageable with the internal thread 4b. The ring is split at 6d to permit it to spring radially outwardly and to be cammed radially inwardly in a ratchet-like connection with the thread 4b. As shown in FIG. 2, I prefer to grind away the thread 6c at a plurality of angularly equispaced locations so as to impart a generally polygonal configuration to the threaded portion of the split ring, thereby ensuring the release of the ring for axial stepping by abutment 12 upon movement of the piston 2 to the right (arrow A). A locking or self-clamping of the ring in the threaded sleeve is avoided.

In operation, hydraulic fluid is supplied at fitting 1c to the chamber 1b between the pistons 2 of the wheel cylinder 1 and the respective force-transmitting members 3 and 3' are urged axially outwardly to press the arcuate brakeshoes upon which they bear against the internal cylindrical braking face of the drum-type vehicular brake. In the event the brake play of one of the shoes or both is not excessive, i.e. there has been no substantial wear of the brake lining, the flange 12 does not engage the ring 6 which remains in threaded engagement with the adjustment sleeve 4 as the piston 2 is shifted in the direction of arrow A. When the frustoconical wedge surface 10 of boss 9 of the piston 2 releases the ring 6, the ring is permitted to resiliently withdraw into the annual recess 11. Any movement of the piston 2 beyond the normal brake play L brings the annular shoulder 12 into engagement with the flank 6b of the ring 6 and draws this ring along the thread 4b so that the ring 6 springs from thread crest to thread crest in a ratchet-like manner. Upon return of the piston 2 (arrow B) under the force of the brake springs, the surface 10 wedges the ring 6 outwardly and locks the new rest position of the piston 2 so as to re-establish the original brake play 2. Thus the ratchet-like stepping of the ring 6 takes place only in the direction of arrow A and is recessed by the wedge-like locking action in the direction of arrow B. Reseating of the assembly can be effected by rotating the ring 6 relatively to the sleeve 4 or merely by pressing the ring 6 axially inwardly without wedging action.

In the system of FIG. 4, the cylinder housing 21 receives a pair of pistons 14 and 15 and defines a chamber 21b to which hydraulic fluid is delivered by the fitting 26. Force-transmitting blocks 16 and 17 are interposed between the pistons 14 and 15 and the respective brakeshoes of a drum-type brake while a threaded spindle 5 is anchored at 5a in the right-hand piston 14 and has its threaded shank 5b received with clearance within the internal bore 18 of piston 15. The wall 18a of this bore terminates at a frustoconical wedging portion 22 which engages the complementary frustoconical surface of a split ring 13 which is internally threaded for engagement with the thread 5b when wedged inwardly by surface 22. The outer diameter of the thread 5b is smaller than the inner diameter of bore 18 so as to be freely slidable over the threaded bolt 5. In this embodiment, however, the ring 13 is provided along its inner periphery with angularly equispaced thread sections complementary to and engageable with the thread 5b during inward wedging as noted earlier. Axially spaced from the wedging surface 22, I provide an abutment 19 which surrounds the threaded bolt 5 and defines with the piston 15 an annular channel 23 into which the ring 13 is admitted when the piston 15 is shifted to the left (arrow A'). Again, the surface 13b defines with the flange 19 a lost-motion distance L' forming the brake play. Seals 27 are provided between the piston 14 and 15 and the wall of cylinder 21 while dust caps 28 close each end of the wheel-brake cylinders in the conventional manner. When hydraulic fluid is supplied to the chamber 21b via fitting 26, the pistons 14 and 15 are urged axially outwardly (arrow B' and A' respectively) to apply their respective brakeshoes to the brake drum. In the event of excessive wear of one or both of these brakeshoes, the relative movement of the piston 15 and ring 13 exceeds the distance L' and flange 19 then entrains the ring 13 which springs from thread crest to thread crest as it is entrained by the flange (arrow 8'). Recess 23 permits the split ring 13 to spread outwardly during the ratchet operation. Upon release of the brake, the brake springs draw the pistons 14 and 15 axially inwardly to a new relative rest position in which piston 15 wedges ring 13 into tight-fitting engagement with the spindle 5, thereby re-establishing the brake play L'.

I claim:

1. An actuating cylinder for fluid-pressure installations, comprising a cylinder housing provided with a cylinder bore; a piston member axially shiftable in said bore for operating a load; and a self-adjusting mechanism in said cylinder co-operating with said piston member for re-establishing a rest position of the latter upon displacement of the piston member beyond a predetermined stroke, said self-adjusting mechanism comprising an adjustment member received in said bore coaxially with said piston member, and a split resilient adjusting ring in form-fitting interengagement between said members upon movement of said piston member in one direction relative to said adjustment member and to said housing and released by said members upon movement of said piston member in the opposite axial direction, at least one of said members being provided with an axially extending thread with generally flat flanks confronting the other of said members, said ring having on one peripheral surface a thread with generally flat flanks complementarily engaging said one of said members and a generally frustoconical configuration at its other peripheral surface, the other of said members being provided with a wedge surface engageable with the frustoconical surface of said ring for wedging said ring into tight-fitting engagement with the thread of said one of said members.

2. An actuating cylinder as defined in claim 1 for hydraulic brake systems for an automotive vehicle wherein the actuating cylinder forms part of a wheel brake and said load is a brakeshoe.

3. An actuating cylinder as defined in claim 2 wherein said one of said members is said adjustment member and said other of said members is said piston member, said members being telescopingly interfitted within said bore.

4. An actuating cylinder as defined in claim 2 wherein said piston member and said ring are formed with complementary conical surfaces for wedging said ring into engagement with the thread of said adjustment member upon movement of said piston member in said one direction.

5. An actuating cylinder as defined in claim 4, further comprising abutment means carried by said piston member and axially spaced from the conical surface thereof by a distance exceeding the axial width of said ring and cooperating with said conical surface of said piston member to form a lost-motion system with said ring and establishing the predetermined stroke of said piston member, said piston member being provided with an annular recess receiving said ring with freedom of radial movement thereof upon entrainment of said ring by said abutment means whereby said ring forms a ratchet with the threads of said adjustment member upon such entrainment.

6. An actuating cylinder as defined in claim 5 wherein said piston member has an axially extending boss at the hydraulically pressurized side of the piston member, said adjustment member is an internally threaded sleeve receiving said boss with slight clearance, and said ring has an external peripheral thread engageable with said sleeve and an internal beveled surface engageable with said boss.

7. An actuating cylinder as defined in claim 6 wherein said boss is provided with an annular outwardly open recess having an axial width exceeding the axial width of said ring and an annular flange spaced from said conical surface of said piston member and forming said abutment means.

8. An actuating cylinder as defined in claim 5 wherein said piston member has an axially extending bore open at the hydraulically pressurized side of the piston member, said adjustment member including an externally threaded bolt extending axially into the bore of said piston member with slight all-around clearance, said ring being internally threaded and externally beveled.

9. An actuating cylinder as defined in claim 8 wherein said piston member is provided with an entrainment flange surrounding said threaded bolt with clearance and axially spaced from said conical surface of said piston member while forming said abutment means.

10. An actuating cylinder as defined in claim 5 wherein the thread of said ring is cut away at angularly spaced locations.

References Cited
UNITED STATES PATENTS 3,338,352  8/1967  Guilhamat.

FOREIGN PATENTS 317,743  8/1929  Great Britain.

DUANE A. REGER, Primary Examiner

U.S. Cl. X.R.

188—79.5